C. J. JOHNSON.
HOSE CONNECTION.
APPLICATION FILED FEB. 2, 1918.
1,324,674.
Patented Dec. 9, 1919.
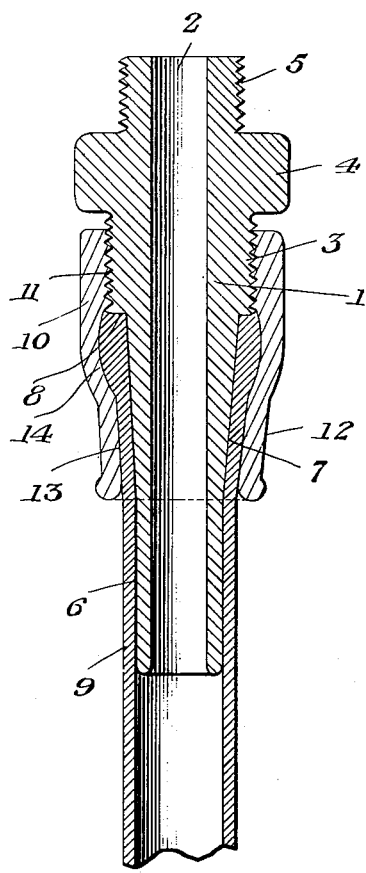
Witnesses
Robt. F. Ruppel.
P. M. Smith.
Inventor
Charles J. Johnson
By Victor J. Evans
Attorney

UNITED STATES PATENT OFFICE.

CHARLES J. JOHNSON, OF SEATTLE, WASHINGTON.

HOSE CONNECTION.

1,324,674.  Specification of Letters Patent.  Patented Dec. 9, 1919.

Application filed February 2, 1918. Serial No. 215,097.

*To all whom it may concern:*

Be it known that I, CHARLES J. JOHNSON, a citizen of the United States, residing at Seattle, in the county of King and State of Washington, have invented new and useful Improvements in Hose Connections, of which the following is a specification.

This invention relates to hose connections.

The object of the invention is to provide a simple, cheap and effective connection for the end of a hose section, enabling one section of a hose to be secured with a water tight joint to an adjoining hose section or to a supply pipe, faucet or other fixture.

In order to obtain a water tight joint, I employ in connection with a tubular body having a tapered portion around which the end of the hose is adapted to be fitted, a clamping sleeve or ferrule having an internally tapered portion surrounding the tapered portion of the tubular body, and an internal annular groove which receives the bulged and compressed extremity of the hose.

With the above and other objects in view, the invention consists in the novel construction, combination and arrangement of parts, as herein described, illustrated and claimed.

The accompanying drawing represents a longitudinal section through the improved hose connection.

The hose connection comprises a tubular member 1 having a central longitudinal bore 2 extending entirely through the same and open at both ends. The member 1 comprises an externally threaded portion 3, an enlarged gripping portion 4 at one end of the threaded portion 3, and a threaded or roughened portion 5 on the opposite side of the enlarged portion 4 from the threaded portion 3.

The body 1 also comprises an externally longitudinal end portion 6, and an externally tapered portion 7 between the cylindrical portion 6 and the threaded portion 3. At the junction of the threaded portion 3 and the tapered portion 7, the latter is relatively smaller or reduced in diameter thereby providing an annular abutment shoulder 8 for the extremity of a hose section indicated at 9.

In conjunction with the tubular body 1 I employ a clamping sleeve or ferrule 10, the larger end of which is internally threaded at 11 to engage the threaded portion 3, of the body. The sleeve or ferrule 10 has a greatly contracting end portion 12 which is internally tapered to provide a hose clamping face 13. The member 10 is also formed with an internal annular groove 14 located between the internally tapered clamping face 13 and the threads 11. The end of the hose section is first slipped over the cylindrical portion 6 of the tubular body 1 and is then crowded upon the tapered portion 7 of said body until the extremity of the hose rests against the shoulder 8. The sleeve or ferrule 10 is then threaded upon the body 1 and screwed toward the enlarged portion 4 of said body. As this operation progresses, the hose 9 is crowded hard against the shoulder 8, causing the end portion of the hose to be compacted and bulged into the annular groove, as shown in the drawing. This results in the formation of a water tight joint, due to the fact that the end portion of the hose is compressed tightly around the tubular body, the bulge in the end portion of the hose forming a resilient cushion which insures close firm compact between the inner wall of the hose and the tapered portion of the tubular body 1.

I claim:

A hose connection comprising a hollow tubular body having an enlargement adjacent one end, externally threaded portions on opposite sides of said enlargement, said body having a reduced smooth portion constituting the major part of said body, and defining a shoulder at its point of juncture with the adjacent threaded portion, said smooth portion being divided into a tapered section having its enlarged end adjacent said shoulder, and a section of uniform diameter throughout into which the tapered section merges, said smooth portion being adapted to be inserted into the end of the hose, with the locker band against said shoulder, a clamping sleeve having an internal threaded portion adjacent one end to engage the adjacent threaded portion of the body, said sleeve being tapered to effectively clamp the hose therebetween in the tapered section of the smooth portion of the body, and said sleeve having an internal angular groove at a point approximately midway of its length to accommodate the bulged portion at the end of the hose.

In testimony whereof I affix my signature.

CHARLES J. JOHNSON,